Sept. 15, 1953   S. W. WOOLSEY   2,652,000
COMBINATION RESERVOIR ENERGY AND PUMPING EQUIPMENT CONTROL
Filed March 20, 1945   5 Sheets-Sheet 2
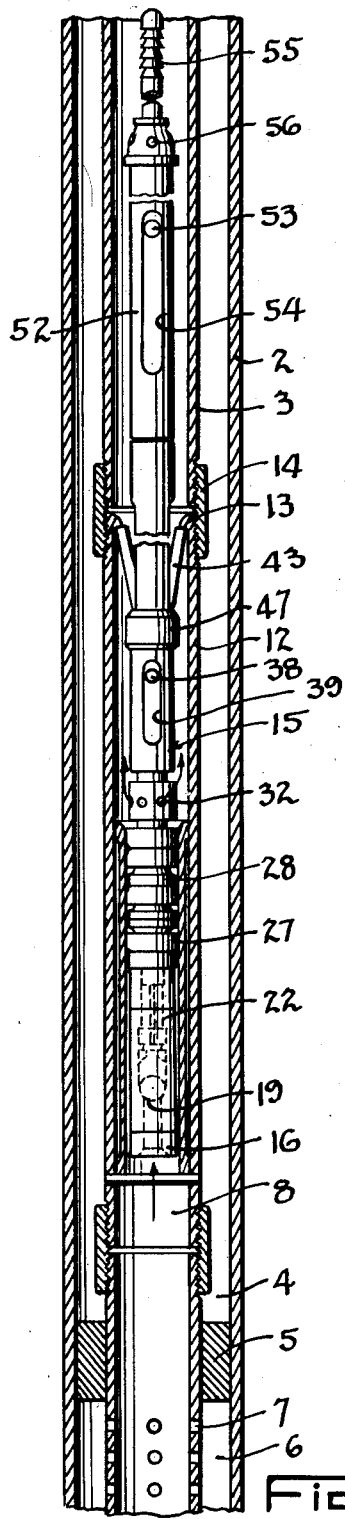
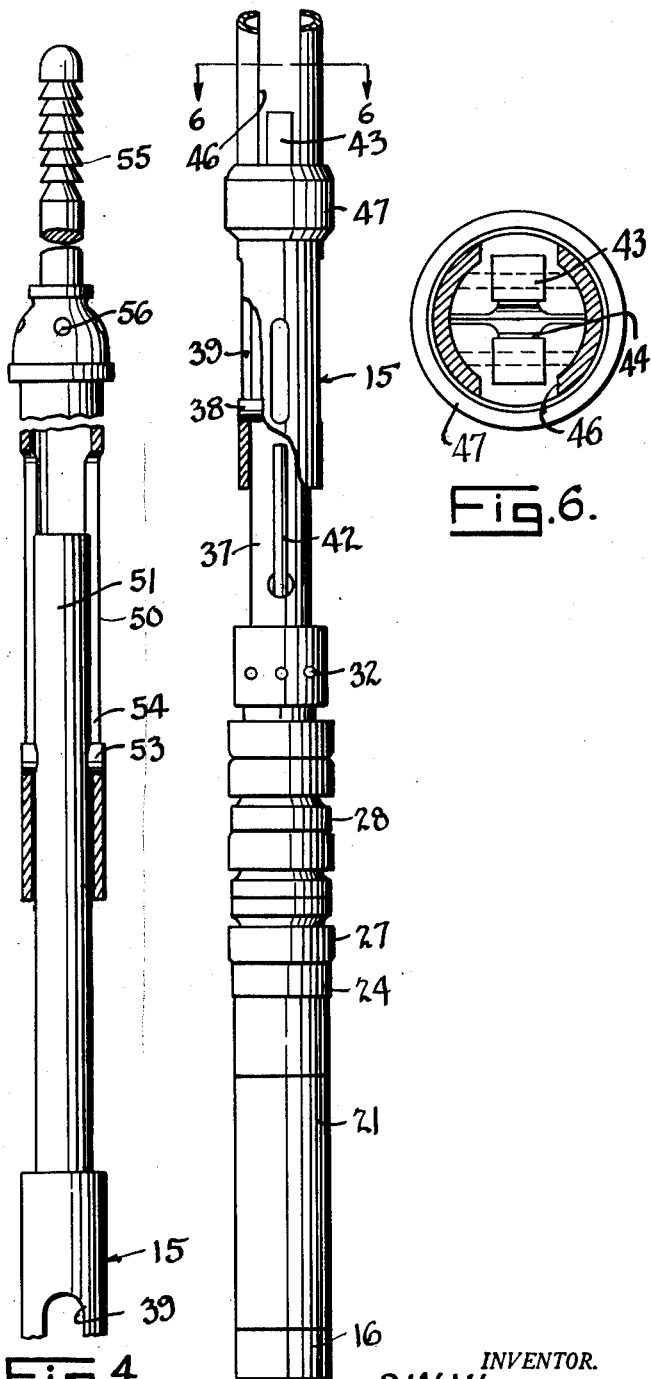
INVENTOR.
S. W. WOOLSEY
Lester B Clark
& Ray L Smith
ATTORNEYS Sept. 15, 1953 S. W. WOOLSEY 2,652,000
COMBINATION RESERVOIR ENERGY AND PUMPING EQUIPMENT CONTROL
Filed March 20, 1945 5 Sheets-Sheet 3
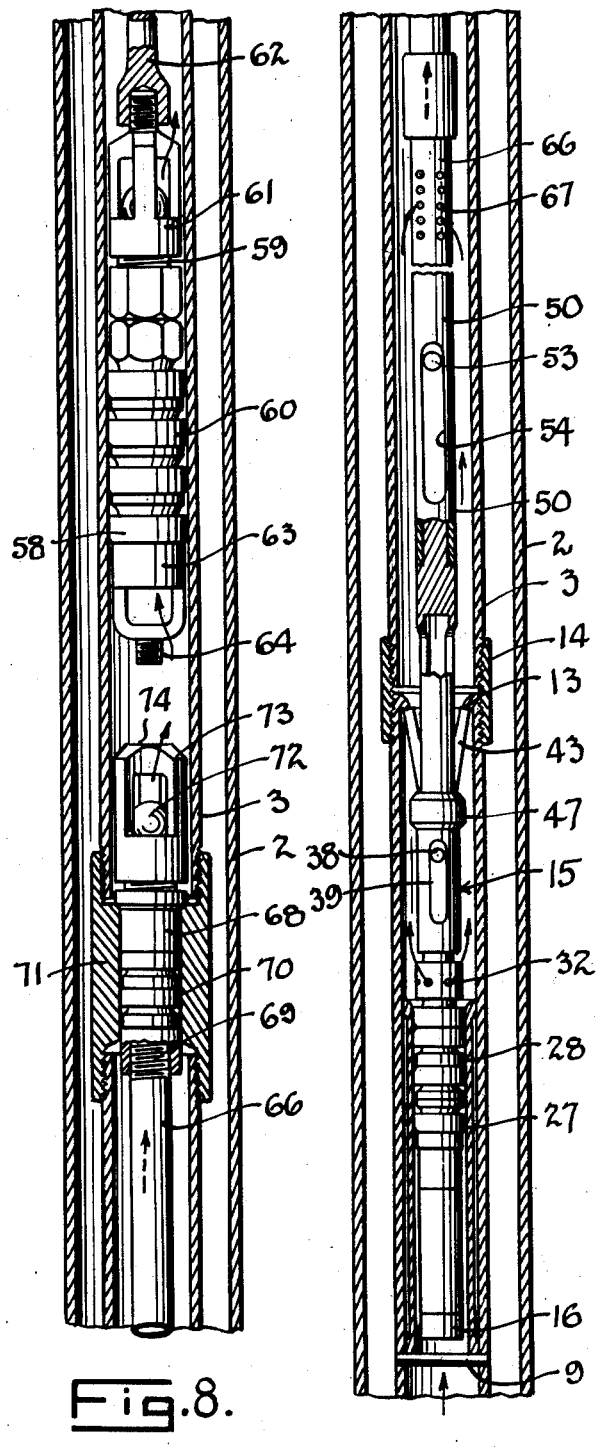
Fig.8.
Fig.9.
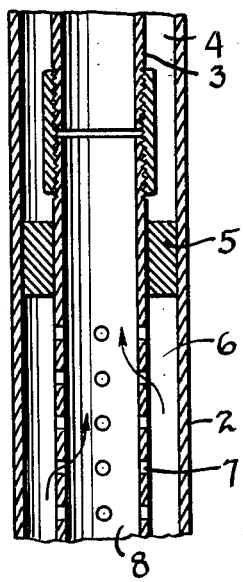
Fig.10.
INVENTOR.
S.W. WOOLSEY
BY Lester B. Clark
 Ray L. Smith
ATTORNEYS Sept. 15, 1953 S. W. WOOLSEY 2,652,000
COMBINATION RESERVOIR ENERGY AND PUMPING EQUIPMENT CONTROL
Filed March 20, 1945 5 Sheets-Sheet 4
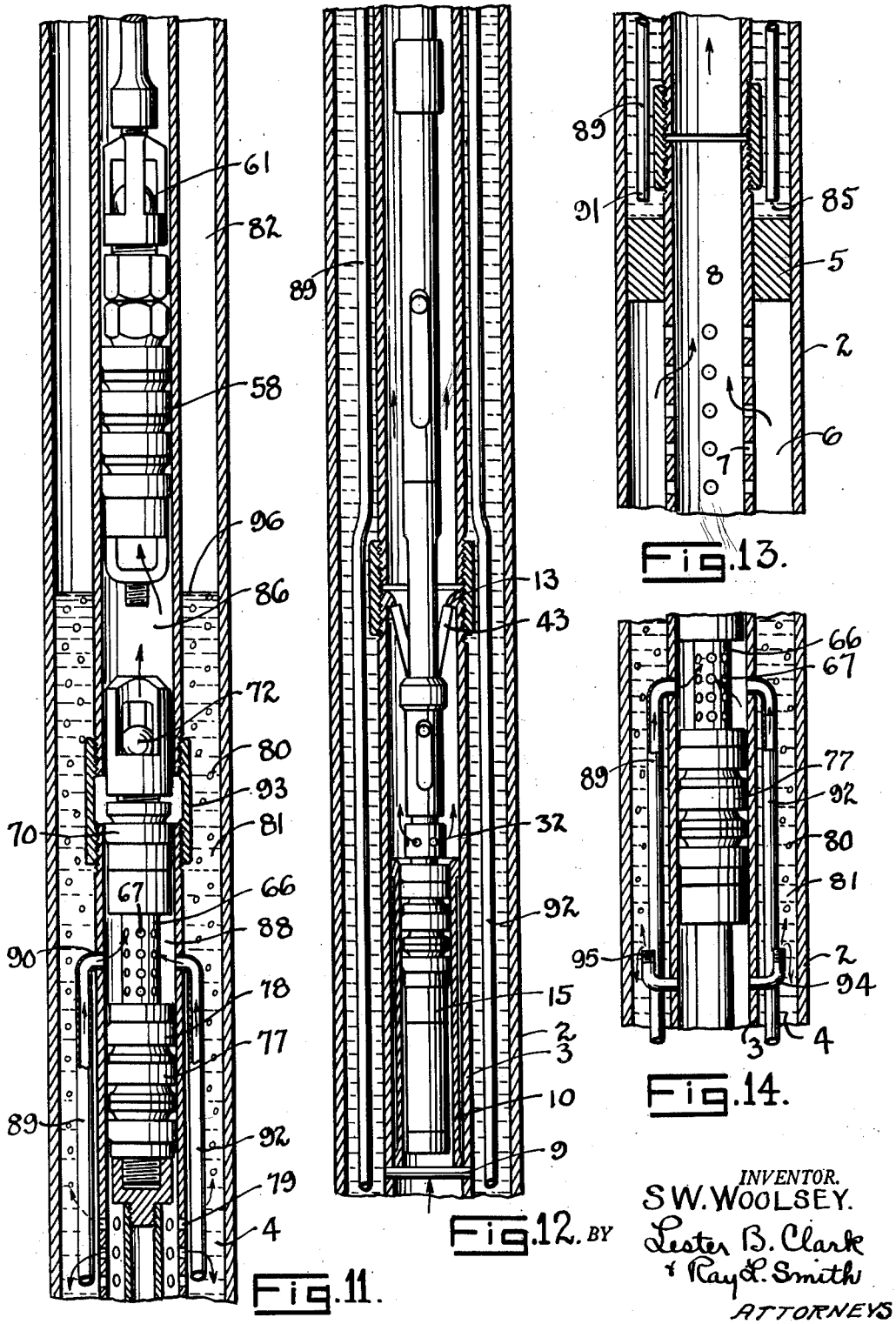
INVENTOR.
S W. WOOLSEY.
BY Lester B. Clark
& Ray L. Smith
ATTORNEYS

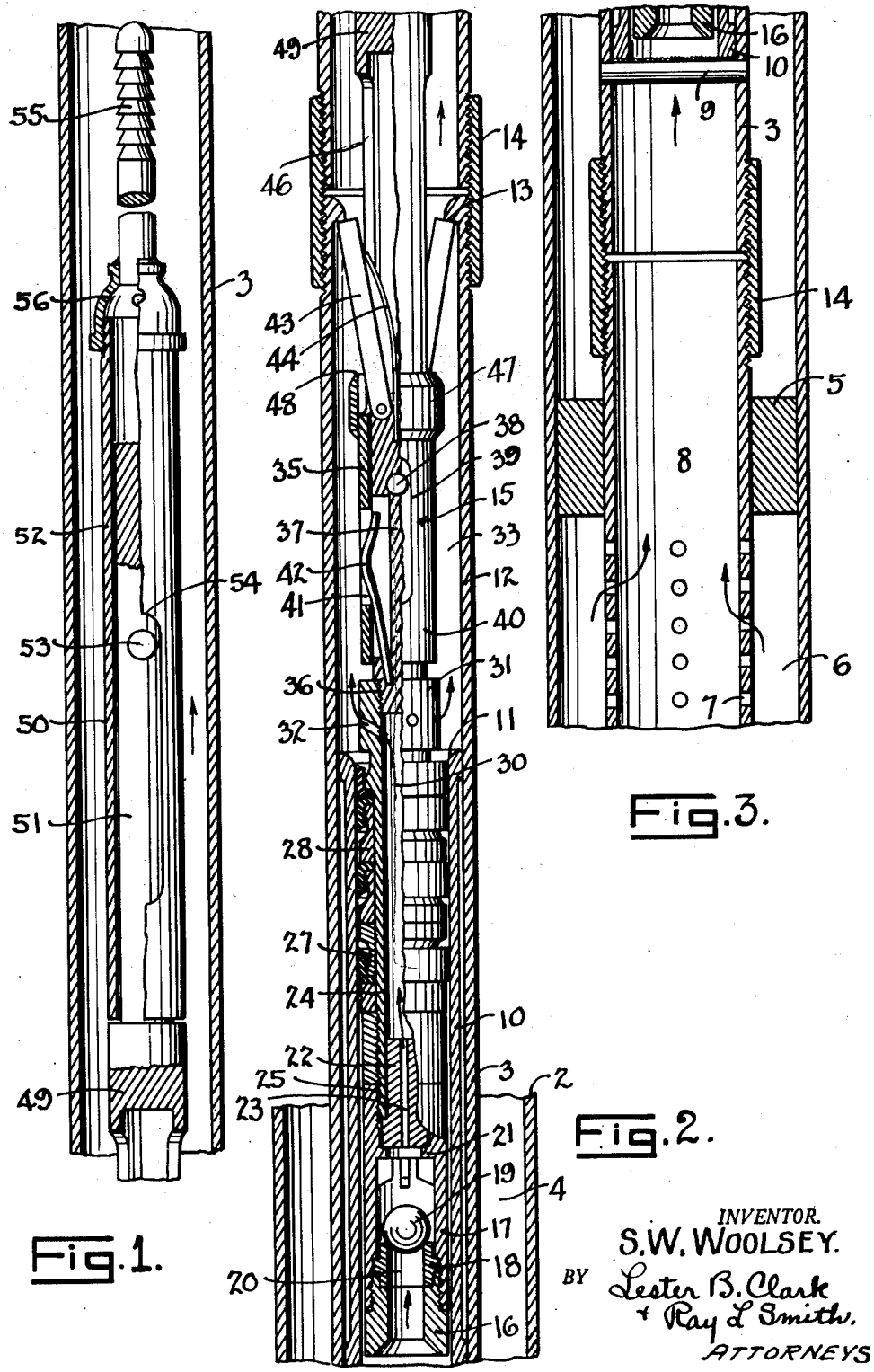

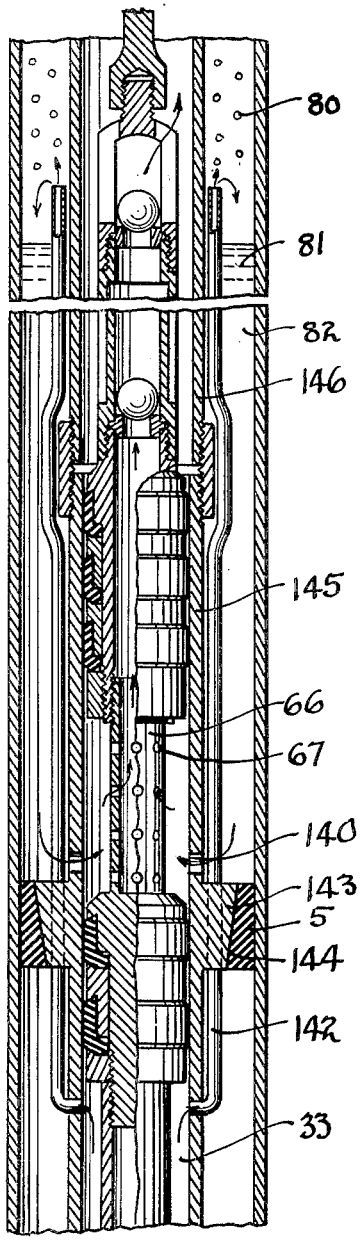
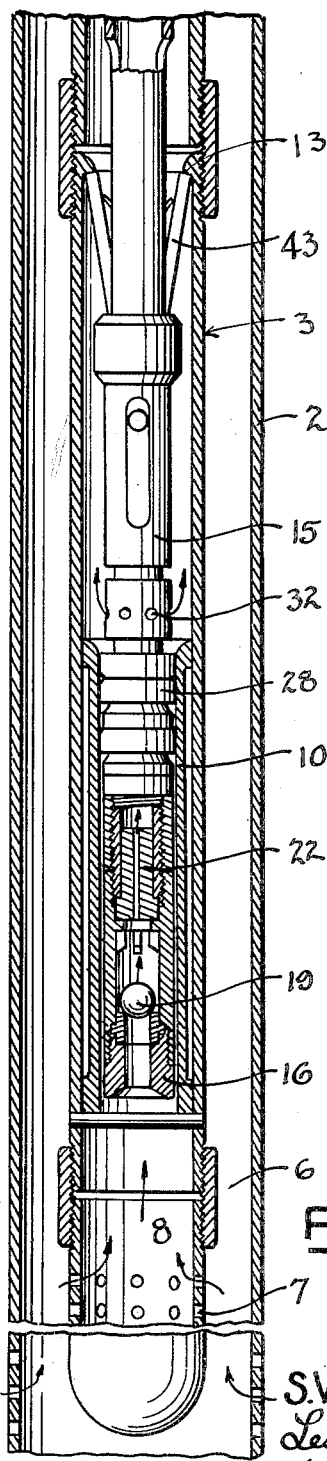
Fig. 15.
Fig. 16.
INVENTOR.
S. W. WOOLSEY.
Lester B Clark
& Ray L. Smith
ATTORNEYS Patented Sept. 15, 1953

2,652,000

UNITED STATES PATENT OFFICE 2,652,000

COMBINATION RESERVOIR ENERGY AND PUMPING EQUIPMENT CONTROL

Sterling W. Woolsey, Houston, Tex.

Application March 20, 1945, Serial No. 583,746

8 Claims. (Cl. 103—203)

The invention relates to an assembly employing a combination of equipment for use in the production of fluids from wells and is of advantage in controlling the flow from the producing formation so as to obtain a maximum of production by confining the natural formation pressure within the formation for the maximum time. Such results are obtained by establishing and maintaining a constant and uniform rate of withdrawal, and by handling the fluids produced in such a manner as to obtain the highest possible efficiency in the equiment used to produce the well, while at the same time providing a means to repair the equipment when worn out.

It is well recognized in the industry that if the pressure can be confined in the formation and the reservoir energy maintained at the highest possible point, a greater production of oil is obtained due to the fact that both the expansible characteristics of the natural gas and the pressure drive of water in the formation tend to drive the oil into the well bore, and that the maintenance of this reservoir energy is essential to maximum recovery, both during the flowing and artificial lift stages in the life of the well.

The present invention directs itself to an assembly of equipment which can be inserted or removed from the bottom of the well, both on and through the usual flow tubing. When the well is equipped for artificial lift after the natural flowing stage has ended the bottom hole pressure protection that the well had when it was flowing naturally will be maintained until depletion of the well and that in combination with this control additional structure is provided so that in a pumping well efficient separation of the gas and liquids produced from the formation can be obtained and only degassified liquid delivered to the pump for its handling while at the same time effectively removing sand and other foreign matter from hazardous positions in the well structure, where such sand or foreign matter could cause expensive damage, and that all of this equipment which is subject to wear and replacement be removable from the wells either on sucker rods or wire line without the necessity of pulling tubing, so that once this equipment is installed all subsequent repair jobs can be done at the smallest possible expense.

Another object of the invention is to provide a bottom hole choke for well pumping installations, which choke is inserted with the pump construction.

Another object of the invention is to provide a removable bottom hole choke which can be inserted or removed in combination with a pump plunger.

Another object of the invention is to provide a removable bottom hole choke which is releasably latched in position.

Another object of the invention is to provide a removable bottom hole choke wherein the sealing assembly about the choke is washed clean of sediment during the flow operation.

Another object of the invention is to provide a combination bottom hole choke and standing valve which can be retrieved from the well.

Another object of the invention is to provide a bottom hole choke on a pumping well so as to equalize the heading pressures and prevent heaving while holding a back pressure on the water cone so as to reduce the oil-water ratio in water driven formations.

Another object of the invention is to provide a bottom hole assembly for pumping wells wherein there is a separation of oil and gas at the bottom of the well so that the gas may escape and the oil is subjected to pumping.

Another object of the invention is to equip a well so that oil and gas separation will occur at the bottom of the well and avoid the necessity of subsequent separation at the surface.

It is also an object of the invention to provide an insertable and removable well tool comprising a combination choke and back pressure valve.

Still another object of the invention is to provide a well tool comprising a combination bottom hole choke and back pressure valve which can be inserted and removed from the well either alone or in combination with a deep well pump.

Still another object of the invention is to provide an equipment for a well bottom comprising a choke and back pressure valve to control the flow and hold a pressure on the formation in a pumping well while degassing the flow and desanding the equipment.

It is also an object of the invention to provide a retrievable differential pressure flow valve for use alone or in combination with a bottom hole choke and back pressure valve.

Still another object of the invention is to provide an insertable constant pressure flow valve embodying a choke for use alone or in combination with a bottom hole choke and back pressure valve.

Other and further objects of the invention will be readily apparent when the following description is considered in connection with the accompanying drawings, wherein:

Figs. 1, 2 and 3 form an assembly view of a combination removable bottom hole choke and back pressure valve illustrating the arrangement of the parts in section, where Fig. 1 shows the upper portion, Fig. 2 the middle and Fig. 3 the lower end.

Fig. 4 is a side elevation of the head of the assembly taken at right angles to the sectional view shown in Fig. 1.

Fig. 5 is a side elevation of the central and lower portions of the tool taken at right angles to the view of Fig. 2.

Fig. 6 is a section taken on the line 6—6 of Fig. 5.

Fig. 7 is a diagrammatic view illustrating some of the parts in section with the tool latched in position in the tubing.

Fig. 8 is a vertical sectional view of the upper part of the assembly showing the standing value and pump in operating position.

Fig. 9 is a continuation of the section of Fig. 8 and showing the lower portion of the assembly latched in position and operating to flow the well.

Fig. 10 is a sectional view which is a continuation of the lower end of Fig. 9 and illustrates the tail pipe and the inlet from the formation.

Figs. 11, 12 and 13 illustrate a vertical sectional view of the assembly in combination with the flow pipes and suction tubes whereby the packer is desanded and the liquid is degassed constantly during the operation of the pump.

Fig. 14 is a modification of the structure shown at the bottom of Fig. 11 and illustrates the manner of permitting escape of the gas below the pump after it has separated above the bottom hole choke.

Figs. 15 and 16 form a vertical sectional view of a combination of a pumping assembly, including a removable pump, bottom hole choke, and back pressure valve, by which the well is pumped and the oil and gas separated by the one assembly of equipment.

Generally the invention embodies structure and equipment whereby the natural flow of the well may be controlled by a removable choke, or the flow of fluid to a pump controlled to obtain uniform production.

The present practice in connection with the flowing and pumping of wells embodies special equipment, special servicing operations, and operators who have been specially trained to manipulate such equipment in order to obtain anywhere near desired results. Such equipment and service is expensive and very often causes delays in the control of the well and the present invention and combination of structure contemplates tools and equipment which can be serviced by the owner or operator without special tools or equipment and without any particular special training.

Figs. 1 to 3, inclusive, show a form of the assembly whereby the natural flow of the well is controlled by a removable choke and back pressure valve so that excessive drops in pressure cannot reach the formation and with a view of maintaining a back pressure on the formation so as to conserve the natural gas therein and to prevent heaving of the sand and water encroachment in the form of water coning due to release of pressures on the formation.

Fig. 2 illustrates the well casing 2 which is permanently fixed in the well bore and holds back the earth formation. In order to recover the desirable fluids from the earth formations below the casing or through openings in the casing, a tubing 3 is usually run into position and the annular space 4 between the casing and the tubing may be closed by a packer 5 as seen in Fig. 3. Such packer may be of any desired type and is illustrated only diagrammatically in the drawing.

The fluids entering the space 6 in the casing below the packer may enter the tubing through the openings 7 and move upwardly in the annular space 8 in the tubing.

If this fluid entering the tubing 3 were permitted to flow freely to the surface, the gas in the formation would soon be dissipated and the flow would be at such an excessive rate that sand would be drawn into both the casing and the tubing and the well would soon become worthless. Such action has a tendency to reduce the pressure on the formation so that water in the formation upon which the oil and gas occur would follow the oil and gas into the well, channelling through the formation and forever cutting off a very large percentage of the oil and gas in the formations around the well. The release of such pressure allows the water to flow in around the well bore in the form of a cone and forces the oil and gas back from the well bore, whereby it is excluded and either a large percentage of the production is water or the well is killed completely.

Various types of equipment have been developed with a view of controlling the flow from the formation to prevent the foregoing detrimental conditions, but as indicated above, all such equipment requires special servicing and tools for its operation.

With the present construction, the tubing 3 is arranged with a cross pin 9 which is permanently fixed in position in order to support a liner 10, which rests on the pin and extends upwardly in the tubing a short distance and is provided with a curved upper end 11. This liner is preferably incorporated in a short length 12 of tubing which also has an over-hanging lip 13 at its upper end and which may be connected in the standard sections of tubing by means of the coupling 14 at each its upper and lower ends.

This liner is of a size to receive an assembly or body 15 which is preferably made up of a collar 16 connected to the nipple 17 with the seat 18 of the back pressure valve 19 clamped by the two. The flow passage 20 permits the upward flow of the fluid from the tubing through the assembly 15, so that any excess pressure from above will be prevented from reaching the formation. The nipple 17 has a shoulder 21 therein which is arranged to receive a choke member 22 having the choke passage 23 extending therethrough. This choke is held in position by the sleeve 24 which is threaded at 25 into the nipple so that the choke is firmly fixed in position against upward movement due to pressure from below. It seems obvious that the passage 23 through the choke may be of any desired size, depending upon the circumstances, characteristics, and pressures encountered in the particular well into which the assembly is to be run.

In order to compel the flow through the tubing to pass through the choke, the sleeve 24 has a plurality of packing rings or cups 27, suitably arranged thereon with spacers 28 therebetween so that any leakage from either below or above will be prevented. These packing cups fit closely within the liner 10 and will be guided into position by the rounded upper end 11 on the liner.

The sleeve 24 has the flow passage 30 therethrough so as to direct the flow from the choke upwardly. The sleeve has a head 31 provided with lateral passages 32 so that the flow may continue on out from the tool 15 into the space 33 inside of the tubing above the liner.

It will be noted that these passages 32 are closely adjacent the uppermost cup on the sleeve, so as to provide a continuous washing action just above the sealing cups and in this manner any foreign matter tending to settle down the tubing is continuously washed away so that when the tool 15 is to be removed, it will not be sanded up or stuck in position.

This feature is of particular advantage because even a very small amount of sand has been found to stick a piece of equipment inside of a pipe or tubing in a well to such an extent as to prevent its removal. Such sticking then causes removal of the entire tubing which is not only expensive, but often compels the operator to kill the well by pumping it full of mud which thereafter has to be washed out.

The latching assembly 35 is threaded at 36 into the upper end of the head 31 on the sleeve so that the entire tool can be held securely in position against the upward pressure from the formation in the tubing. This latching assembly includes an upstanding spindle 37 having a cross-pin 38 projecting from its surface. This pin is arranged to receive a slot 39 provided in the skirt 40 which is slidably arranged around the spindle. The length of the slot 39 limits the relative sliding movements of the parts. This skirt has a window 41 therein arranged to receive the spring 42 which is carried by the spindle. This spring tends to hold the skirt in the position shown in Fig. 2, which is the normal or lowermost position, so as to permit the dogs 43 to extend outwardly under the lip 13. These dogs are in turn urged outwardly by leaf springs 44 so they will snap under the lip 13 when the tool is moving downwardly through the tubing.

The skirt 40 extends upwardly above the upper end of the spindle 37 and is slotted at 46 so that the dogs 43 may be retracted from under the lip 13 when the tool is to be released and retrieved from its operating position. This retracting operation is accomplished because of a collar 47 fixed on the upper end of the skirt and having its inner surface 48 arranged to engage the dogs and cause them to be retracted. This extension of the skirt is indicated at 49 and is arranged to receive the jar 50 which is made up of the bar 51 formed as part of the extension 49 and the outer casing 52, which is slidable thereon. A pin 53 on the bar and the slot 54 in the casing limit the sliding movement or jarring action which is accomplished by connecting any desired over-shot or retrieving tool to the spearhead 55 formed on the upper end of the casing 52, thence the opening 56 in the upper part of the casing permits movement of the parts and avoids hydraulic lock.

In operation, the sub 12 will be incorporated in the string of tubing and the tubing lowered in position with the packer 5, closing the area between the tubing and the casing. The entire tool 15 will then be positioned in the well, possibly by lowering it on a wire line or string of sucker rods which can be released from the tool in any desired manner after it has been latched in position. The dogs 43 will be held retracted during the downward movement because the weight of the tool is suspended from the top and the spring 42 will tend to hold the sleeve 40 in uppermost position by extending outwardly beneath the lower end of the skirt 40. When the tool stops against the cross-pin 9, the downward movement of the skirt will continue due to the weight of the parts above it, causing the spring to be forced inwardly until it snaps into the window 41 as seen in Fig. 2. The tool is now firmly latched in position and ready for operation.

It seems obvious that the combination of the choke and the back pressure valve will protect the formation against any reduction in pressure on the one hand and any back pressure from above on the other hand.

It has been found in actual practice that the position of a choke in a natural flowing well tends to gradually build up the bottom hole pressure by confining the gas and utilizing the gas to force the oil into the well bore rather than permitting the gas to dissipate and flow freely up the well tool. In other words, the choke maintains a back pressure against the formation so as to control the rate of flow and prevent the entrance of water into the formation and washing of sand into the well and equipment. Whenever it is desired to change the rate of flow or if the choke should become worn, the entire assembly can be readily retrieved by running an over-shot or retrieving tool into the well, engaging the spearhead 55 and exerting an upward pull to retract the latching dogs 43. Such an operation is inexpensive and can be accomplished by any ordinary hoisting mechanism by the employees or operators on the well in a very short period of time.

Figs. 4, 5, and 6 illustrate the tool in elevation so as to provide a better understanding of the structure. Fig. 4 shows the casing 59 as having been elevated in order to pull up on the skirt 40. This movement retracts the dogs 43 as best seen in the upper part of Fig. 5. If this upward movement is accomplished by quickly raising cable or rods by which the tool is operating, a double jarring action tending to pull the tool loose is thus obtained, one when the cross-pin 53 strikes the bottom of the slot 54 as seen in Fig. 4 and, the other jar where the cross-pin 38 strikes the bottom of the slot 39, as seen in Fig. 5. With this arrangement, no difficulty is encountered in removing the tool due to the fact that the passages 32 permit the washing away of any foreign matter adjacent the top of the sealing cups.

Figs. 8, 9, and 10 form an assembly view of an application of the tool 15 for installation in a well in combination with a reciprocating type of pump 58. Pumps of this sort are standard construction and are made of a body 59, having the sealing cups 60 thereon and carrying a traveling valve 61 adjacent the upper end. Such a pump is reciprocated by a string of sucker rods 62. In the present arrangement, the bottom end of the pump presumably is provided with a cage 63 having a threaded pin or stud 64 on the lower end. The general combination of structure shown in Fig. 1 is modified slightly in that the casing 50 has had the upper portion thereof removed and a pipe 66 connected thereto. This pipe may have a plurality of openings 67 therein to admit the flow from the formation which has passed through the tool 15. This flow is of course made up of both the gaseous fluid and the liquids which have passed through the tool 15. The upper end of the pipe 66 has a standing valve assembly 68 threaded at 69 to the upper end thereof. The standing valve has a plurality of sealing cups 70 to form a part of the tubing assembly 3. The check valve 72 arranged for movement in the cage 73 forms the standing valve proper. In order that both the tool 15 and the pump may be inserted and removed relative to the tubing, the cage will have a threaded opening 74, which is adapted to receive the pin or stud 64 on the lower end of the pump. When the assembly is to be positioned in the well, the tool 15 will be threaded onto the pin 64 and the whole assembly lowered into the well by means of the string of sucker rods 62.

When the standing valve 68 reaches the coupling 71, it can be moved into the position seen in Fig. 8. This will permit latching of the dogs 43 under the lip 13 so that a slight rotation of the sucker rods will then unscrew the pin 64 so as to leave the combination choke and back pressure valve firmly latched in position. The pump can now be reciprocated through its normal working stroke to carry on the pumping operation.

This form of the invention shown in Figs. 8 to 10, inclusive, is an adaptation of the tool 15 to a pumping well. In this operation also the arrangement of the passages 32 keeps the foreign matter washed away from the choke and back pressure valve assembly so that if for any reason it has to be removed, the removal may be accomplished by reconnecting the pin 64 into the top of the standing valve. In the majority of instances, however, if the pump needs repair, it may be removed with the sucker rods without molesting the tool, the choke, or the back pressure valve. Very often, however, if the pump is being removed, it might be advisable to also remove the tool 15 for purposes of inspection.

No special tools are required in the insertion or removal of the assembly shown in Figs. 8 to 10. The jarring action obtainable with the pipe 66 and the casing 50 is sufficient to retract the latchings and accomplish the removal of the entire assembly so that no special servicing operation is required and the whole assembly may be handled by the regular service crew who are pulling the rods or tubing with the usual equipment.

Figs. 11 to 14, inclusive, show a modified arrangement of the combination pumping and control assembly of Figs. 8 to 10, inclusive, wherein the structure has been modified for use particularly with wells having a high gas-oil ratio and a high solution gas content.

It is well understood that in some formations there is a large percentage of gas in solution in the liquids in the formation and that when such formation is permitted to flow into a well bore, the pressure is usually reduced a substantial amount which permits the gas to come out of solution. Such gas in any substantial quantity only interferes with the operation of the pump and it is often desirable to effect at least an initial separation of the gas and the liquid from the formation in the bottom of the well.

It will be borne in mind that a well may have a pressure of several hundred pounds in the bottom of the well at the formation, but if the well is of substantial depth, this pressure is insufficient to elevate the oil of the well to the surface and a pump must be provided.

The pump chamber directly below the pump presumably is the first area where there is any substantial reduction of pressure during the suction stroke of the pump. It has been found that if the gas comes out in any substantial quantity and below the pump, the vaporizing of the gas at this point interferes with the pumping operation because the pump is then pumping gas instead of liquid in substantial amount.

With the present combination of structure as shown in Figs. 11 to 14, inclusive, a provision has been made to eliminate a substantial part of the gas by separating it from the liquid and allowing such separated gas to flow upwardly in the casing outside of the tubing. To accomplish such a procedure, the tool 15 is slightly modified. This modification consists of a blind packer or block-off plug 77 which is best seen in the lower portion of Fig. 11. This plug has sealing cups 78 thereon to form a seal on the inside of the tubing. The tubing is in turn provided with a plurality of openings 79 below the elevation of the block-off plug 77 so that the flow of fluids from the tool 15 will be forced out of the tubing into the annular space 4 between the tubing and the casing. This fluid will be made up of a considerable amount of gas which has already been caused to come out of solution due to the fact that there has been a substantial reduction in pressure at the choke 22. The casing is usually open to the atmosphere at the surface or has at least a much lower pressure therein than the pressure at the bottom of the well, so that the mixture of gas and oil, and water if present, moving into this annular space 4, will naturally effect a separation and Fig. 11 illustrates the bubbles of gas 80 moving up through the oil 81 and this gas will of course occupy the upper area 82 between the tubing and the casing and may either flow into the atmosphere at the surface or be taken off at the proper point of storage or pipe line.

The oil 81 on the other hand remains in the casing and and must be elevated by operation of the pump 58.

In order to effect as much separation of the gas and oil as possible, which is preferably designated as degassing of the oil, and for the further purpose of desanding the packer 5 so as to prevent any further difficulty in the pulling of the tubing and the packer 5, the suction for the pump 58 has been arranged to occur at the point 85 as closely adjacent the top of the packer 5 as seen in Fig. 13. The initial suction, due to the up-stroke of the pump 58, of course occurs in the pump chamber 86 in the center of Fig. 11. When the traveling valve 61 closes on the up-stroke and causes opening of the standing valve 72, this in turn causes a reduction of pressure in the upper end of the pipe 66 so as to draw liquid in through the openings 67.

It will be noted in Fig. 11 that the portion of the pipe 66 between the standing valve assembly 70 and the block-off plug 77 is relatively short so that a substantial suction may be created in the chamber 88 formed inside of the tubing.

Figs. 11, 12, and 13 show a pipe 89 connected into the chamber 88 at 90 and extending down to the point 85. The lower end 91 of this pipe will therefore draw the oil from the inside of the casing upwardly and into the pump. An additional pipe 92 may be provided. This arrangement of structure insures that any foreign matter such as sand or scale moving into the casing, which might settle downwardly on the packer, will be picked up by the suction of the pump and carried along with the oil being removed from the well. In this manner the packer 5 is desanded continuously as the pump is operating so there can be no accumulation of the material thereon which would prevent its removal if and when the tubing is to be pulled.

Outside of the details just described, the structure of the pump and the tool 15 is the same as explained in the previous figures.

One feature of this arrangement is that if it is desired to flush out the casing by reverse circulation of the fluids into and up in the casing, the standing valve may be unseated and pulled up a short distance so that the packing cup on the standing valve assembly 70 will be positioned in the recess formed by the coupling 93 between the ends of the two pipes or pieces of tubing that are coupled together by such coupling. In this manner, the fluid may by-pass the standing valve, moving downwardly through the tubing out through the pipes 89 and 92 and thence up through the casing. Such a provision is desirable because some portion of the pump might cut out or the well may be shut down which might allow an accumulation of foreign matter on the various parts.

Fig. 14 shows a slightly modified form of the arrangement shown in Fig. 11 in that the openings 79 have been provided with an upwardly turned elbow such as 94 which will insure directing the flow upwardly so as to facilitate separation of the gas.

If desired, the threaded ends 95 of these elbows may be fitted with an extension pipe of any desired length which may extend upwardly in the casing a sufficient distance to discharge even above the level 96 of the head of liquid in the casing, which is of course the pump down level during the separating period. In this manner, the gas will not have to force its way through a head of liquid but will more readily discharge into the casing. These pipes may be utilized if a greater area for separation of the foreign matter is desired, or if it is desired that a head be placed against the suction of the pump.

With the present arrangement, it seems obvious that the well can be equipped as desired to start and the arrangment modified and changed by merely running a wire line or string of sucker rods into the tubing to pull out the valve and the choke assemblies and to replace them with others for the purposes of repair and readjustment in accordance with the conditions and characteristics of the well during its productive life. Thus the well may be flowed to recover all of the oil which will enter the well and until say 100% salt water is being produced without ever having to pull the tubing in order to repair the valves or to make changes in operational or setting points.

Figs. 15 and 16 show an arrangement somewhat similar to that in Figs. 11 to 13, inclusive, except that the arrangement is such that the choke and back pressure tool 15 is disposed in the tubing below the elevation of the packer 5. Such an arrangement eliminates the pipes 89 because the inlet to the pump will be through the openings 140 directly adjacent the inlets 67 in the pipe 66. The flow from the choke moving up through the tubing in the chamber 33 will move into the pipes 142 which extend through a tapered flange 143 fitted into the tapered portion 144 of the packer. These pipes extend upwardly into the chamber 62 in the casing so that the gas in the form of the bubbles 80 will move upwardly in the casing while the oil 81 will settle downwardly in the casing and move through the openings 140 during the pumping operation. This will wash the packer free of foreign matter while the pump is in operation. As indicated heretofore, however, situations and circumstances may arise whereby an accumulation of foreign matter will occur on the top of the packer where the well is shut down. This provision of the openings 140 allows a reverse circulation of liquid pumped downwardly through the tubing and upwardly through the casing. When the assembly is lifted out of the working barrel 145, which is of slightly smaller size than the internal diameter 146 of the normal tubing, the elimination of the pipe 89 prevents a clogging of larger pieces or other foreign matter and this arrangement of Fig. 15 and Fig. 16 may be more advantageous in some types of wells.

Heretofore the equipment which was utilized to control the bottom hole pressure and the equipment used to produce have been two separate and distinct types of equipment, neither of which was readily adaptable for use with the other and in fact they were mutually exclusive; whereas, the present invention contemplates such modifications, revision, and conception of the equipment that both the control and the production equipment can be used either independently or simultaneously in accordance with the conditions and circumstances encountered.

It has been found that the present construction and equipment when used in proper combinations for individual wells results in the maintenance of a constant back pressure against the formation, a lessening of the tendency for water to cone up into the oil in the formation, reduces the possibility of sand heaving in and either cutting out the screen or sanding up the well, extends the life of the well and increases the ultimate recovery by maintaining the maximum of reservoir energy within the formation instead of allowing it to be dissipated wantonly, sets up a state of conditions wherein the fluids withdrawn across the formation pressure controlled equipment are subject to a sudden drop in pressure and expansion wherein the gasses held in solution under pressure are released from solution and are then further passed through additional equipment, effectively separates the free gas from the degassified liquid and prevents the entrance into the pump of any fluids except the degassified liquid, establishing therein a high efficiency in the operation of the pump. This gas elimination from the pump eliminates gas locks from the pump and the pounding out and sand blasting of valves and wearing parts of the pump, thus extending the life of the pump and reducing the number of servicing operations required to keep the well on production. The elimination of this gas from the pump also establishes a uniform and equal load on the lifting equipment and prime mover permitting the load to be perfectly balanced.

It has also been found that the elimination of gas from the liquid being pumped up through the tubing eliminates emulsification of oil and water. The design of this equipment above the formation pressure control means also takes advantage of the hydraulic action of fluid in motion to effectively remove sand and/or other solids from a hazardous position in the well bore, thus reducing the possibility that the tubing and packer may become stuck within the well bore.

Broadly the invention contemplates an assembly of equipment which can be applied to the tubing in the production of fluids from wells so that the entire potential production from the well may be obtained without the pulling of the tubing after the initial installation of the equipment has been made, that all repairs, replacements, and adjustments can be accomplished by the removal and insertion of valves, chokes, and pressure flow valves by the use of a wire line or string of stucker rods while leaving the tubing permanently in position.

What is claimed is:

1. A tool for well bores having a well casing and tubing, a packer to seal the well between such casing and tubing, a flow choke inlet at the lower end of the tubing below the packer, a removable flow choke assembly of a predetermined size and length to meter the flow and removably disposed in the tubing above said inlet, means including pivoted dogs mounted on the assembly and releasably engageable with the tubing to latch said assembly including the choke in the tubing, flow choke outlet means from the tubing to the casing above the choke and also above the packer, a plug sealing the tubing above such outlet, a reciprocating pump in the tubing above said plug, pumping inlet conduits connected at one end into the tubing above the plug, the other ends of said conduits extending to points adjacent said packer and below said flow choke outlet means so that the flow through said choke may effect a gravitational separation outside the tubing, so that the pump intake withdraws sand, foreign matter and degassed liquids.

2. A tool for cased well bores comprising a tubing, a packer to seal the well between the well casing and said tubing, a flow choke inlet at the lower end of the tubing below the packer, a removable flow choke assembly disposed in the tubing above said inlet, means including pivoted dogs mounted on the assembly and releasably engageable with the tubing to latch said assembly including the choke in the tubing, flow choke outlet means from the tubing to the casing above the choke and also above the packer, a plug sealing the tubing above such outlet, a reciprocating pump in the tubing above said plug, pumping inlet conduits connected at one end into the tubing above the plug, the other ends of said conduits extending to points adjacent said packer and below said flow choke outlet means, and means on the pump to connect to the flow choke assembly to release said latch for removal of the choke.

3. A bottom assembly for production from wells having a casing, a tubing, a seal thereon in the casing, a bottom hole control tool including a hollow body removably insertable in the bore of the tubing, means to seal the body in the tubing, a removable choke disposed in said body to control the pressure and flow from the formation, and a back pressure valve to protect the formation from pressure in the tubing, outlets from said body into said tubing above said casing seal, outlets from said tubing to the casing, an extension upwardly from said body, inlets therein to admit degassed liquid from said casing, a standing valve at the upper end of said extension, and a pump reciprocal in the tubing to create a suction above said standing valve to draw in only degassed liquid.

4. A bottom assembly for production from wells having a casing, a tubing, a seal thereon in the casing, a removable bottom hole control tool including a hollow body slidable into and out of the bore of the tubing, means to seal the body in the tubing, a choke disposed in said body to control the pressure and flow from the formation, outlets from said body into said tubing above said casing seal, outlets from said tubing to said casing, an extension upwardly from said body which is also removable as part of said tool, inlets therein to admit degassed liquid from said casing, a standing valve at the upper end of said extension, a pump reciprocal in the tubing to create a suction above said standing valve, and means to connect said pump to said standing valve to remove said body.

5. A bottom assembly for production from wells having a casing, a tubing, a seal thereon in the casing, a removable bottom hole control tool including a hollow body constructed to be slidably insertable through the bore of said tubing, means to slidably seal the body in the tubing, a choke disposed in said body to control the pressure and flow from the formation and removable with said tool, an extension upwardly from said body, a pump reciprocal in the tubing to create a suction above said extension, said tubing having outlets therein to discharge the formation fluid from said body outwardly into said casing, inlets in said extension to admit degassed liquid from said casing, said inlets comprising means extending to the elevation of the seal between the casing and tubing and connected to the upper end of said extension so that the liquid to the pump is degassed in the casing.

6. A bottom assembly for production from wells having a casing, a tubing, a seal thereon in the casing, a removable bottom hole control tool including a hollow body constructed to be slidably insertable through the bore of said tubing, means to slidably seal the body in the tubing, a choke disposed in said body to control the pressure and flow from the formation, an extension upwardly from said body, a pump reciprocal in the tubing to create a suction above said extension and also removable, said tubing having outlets therein to discharge the formation fluid from said body outwardly into said casing, inlets in said extension to admit degassed liquid from said casing, said inlets comprising means extending to the elevation of the seal between the casing and tubing and connected to the upper end of said extension so that the liquid to the pump is degassed in the casing, and the sand and foreign matter settling in the casing is picked up through said conduit to desand the tubing and casing seal.

7. A bottom assembly for production from wells including a casing, a tubing, a seal thereon in the casing, a removable bottom hole control tool including a hollow body sealed in the tubing, said body being constructed to be slidably inserted through the bore of said tubing, a choke disposed in said body to control the pressure and flow from the formation, an extension upwardly removable from said body, a removable pump reciprocal in the tubing to create a suction above said casing seal, said tubing having outlets therein to discharge the formation fluid from said body outwardly into said casing for separation of gases and liquids by gravity, and pump inlet means to pick up the formation liquids settling between the casing and tubing so that the liquid to the pump is degassed in the casing.

8. A bottom assembly for production from wells including a casing, a tubing, a seal thereon in the casing, a bottom hole control tool including a hollow body sealed in the tubing, said body being constructed to be slidably inserted through the bore of said tubing, a removable choke in said body to control the pressure and flow from the formation, an extension upwardly from said body, a pump reciprocal in the tubing to create a suction above said casing seal, said tubing having outlets therein to discharge the formation fluid from said body outwardly into said casing for separation of gases and liquids by gravity, and pump inlet means to pick up the formation liquids settling between the casing and tubing so that the liquid to the pump is degassed in the casing, said inlet means having downwardly directed pick up pipes extending to an elevation adjacent said casing seal so said pump picks up both the liquids and solids flowing into the casing.

STERLING W. WOOLSEY.

References Cited in the file of this patent

UNITED STATES PATENTS

| Number | Name | Date |
|---|---|---|
| 1,555,354 | Carson | Sept. 29, 1925 |
| 1,959,621 | Fry | May 22, 1934 |
| 2,179,480 | Coberly | Nov. 14, 1939 |
| 2,179,481 | Coberly | Nov. 14, 1939 |
| 2,179,482 | Coberly | Nov. 14, 1939 |
| 2,204,817 | Nixon | June 18, 1940 |
| 2,246,811 | Otis | June 24, 1941 |
| 2,275,346 | Bryan | Mar. 3, 1942 |
| 2,307,983 | Barnes | Jan. 12, 1943 |
| 2,348,564 | Otis | May 9, 1944 |
| 2,349,164 | Gilbert | May 16, 1944 |
| 2,353,652 | Coonrod | July 18, 1944 |
| 2,377,981 | Taylor et al. | June 12, 1945 |
| 2,397,419 | Humason | Mar. 26, 1946 |